Oct. 29, 1935.  S. L. KERR  2,018,793
GOVERNOR CONTROL MECHANISM
Filed June 23, 1931  3 Sheets-Sheet 1
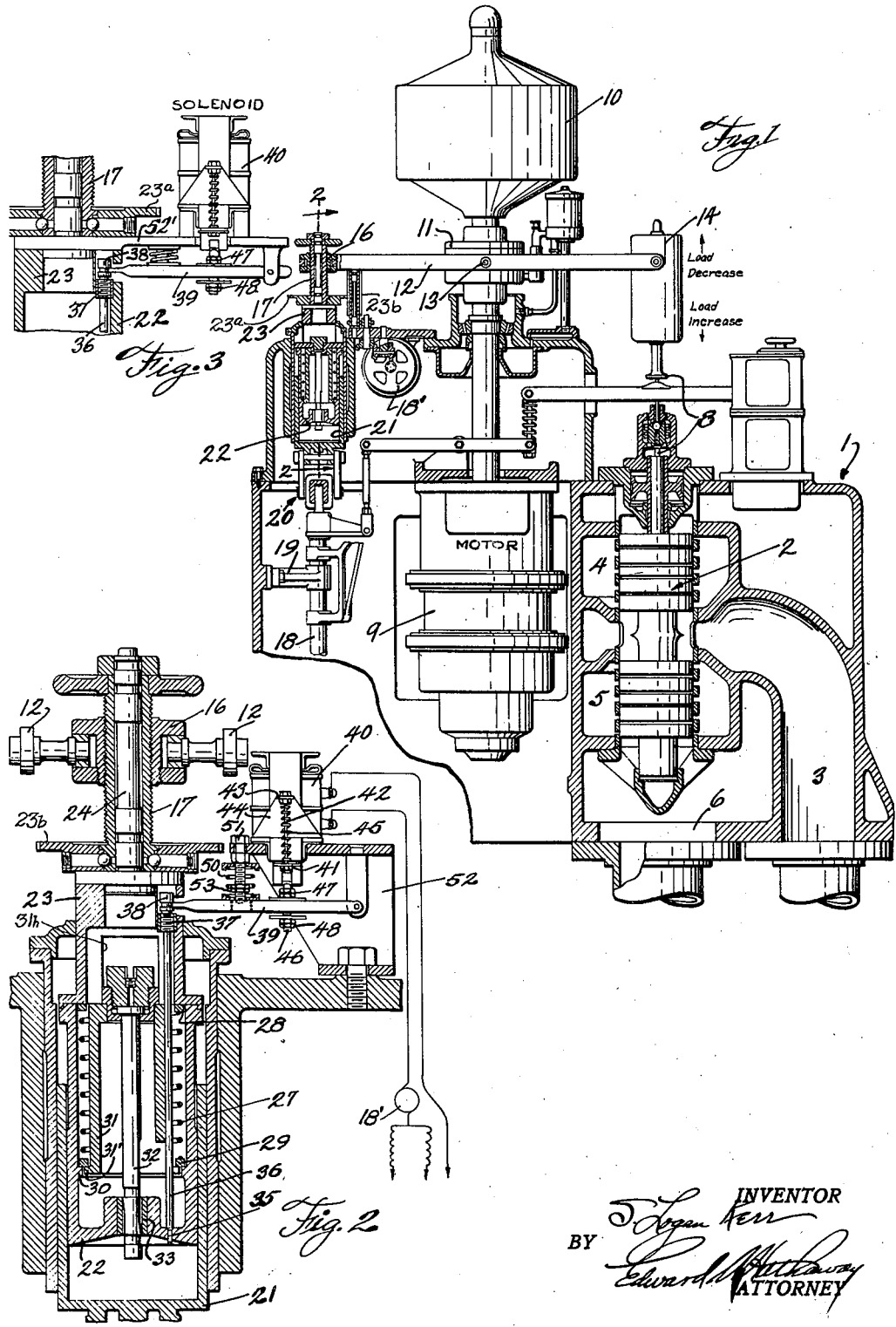

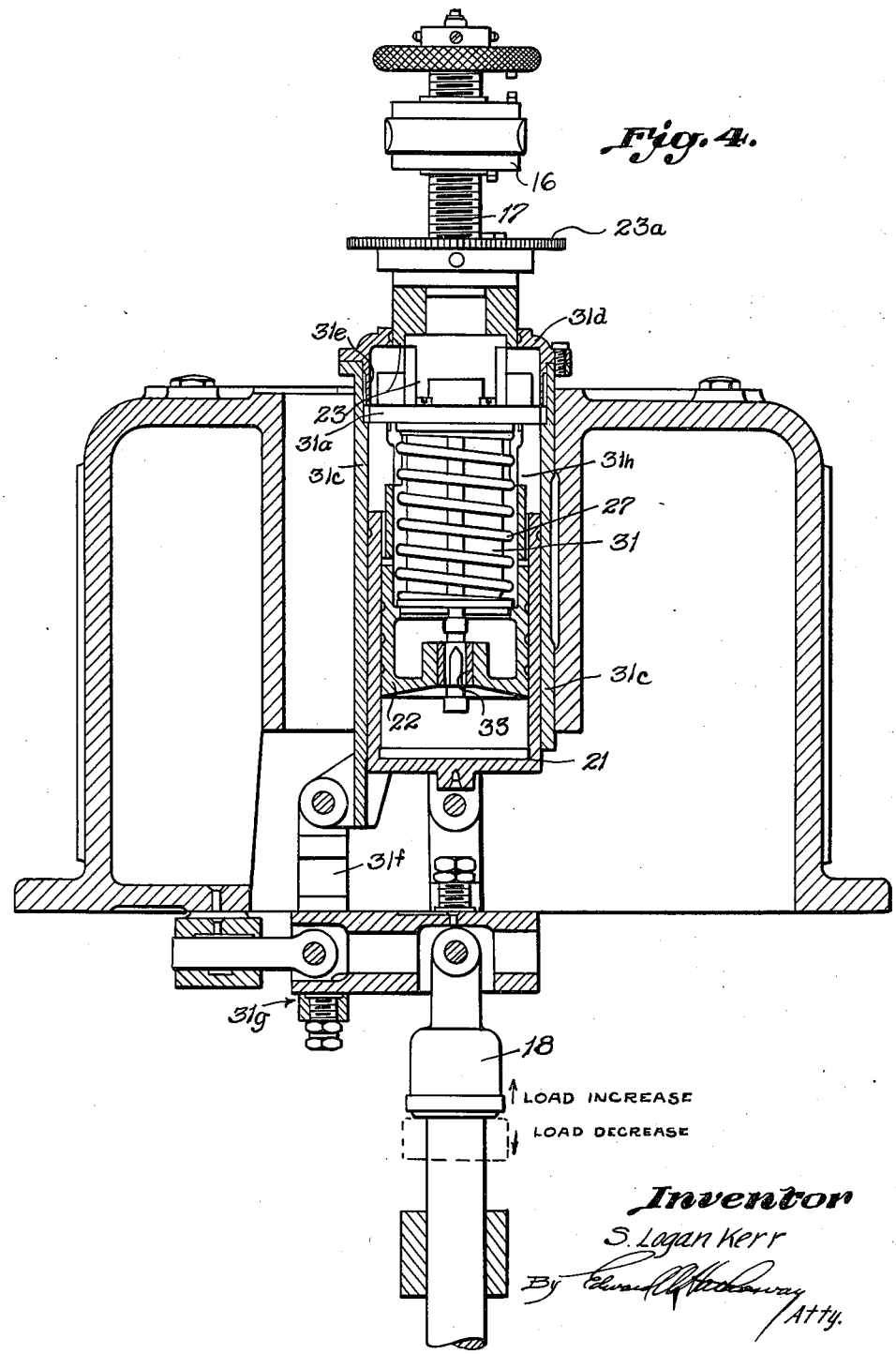

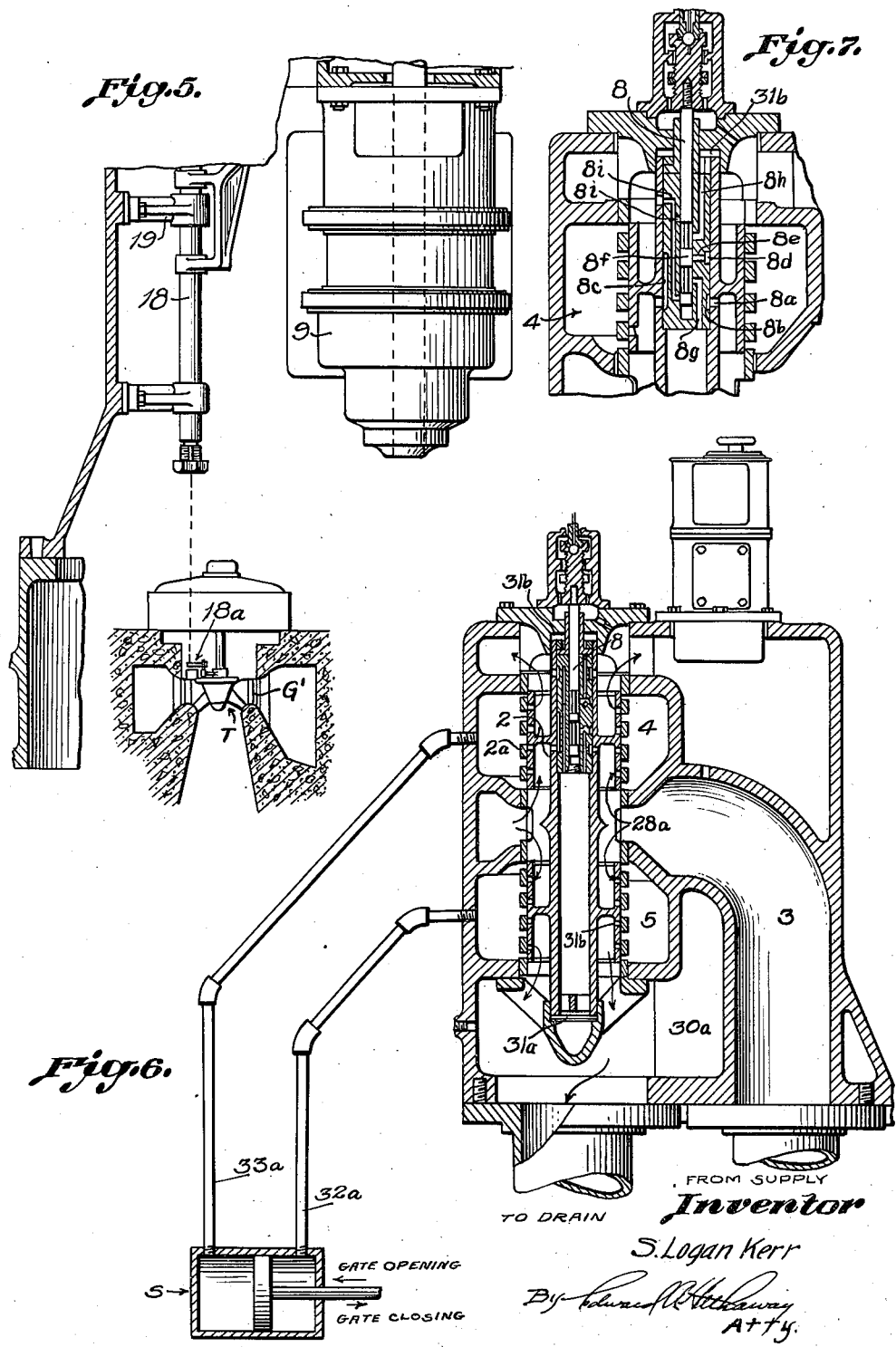

Patented Oct. 29, 1935

2,018,793

UNITED STATES PATENT OFFICE 2,018,793

GOVERNOR CONTROL MECHANISM

Samuel Logan Kerr, Philadelphia, Pa., assignor, by mesne assignments, to Baldwin-Southwark Corporation, a corporation of Delaware Application June 23, 1931, Serial No. 546,280

12 Claims. (Cl. 264—3)

This invention relates generally to control apparatus for prime movers and more particularly to improved means for controlling load adjustment of a prime mover irrespective of its speed, the invention being especially adapted for application to speed governors for hydraulic turbines whereby the rate of operation of the usual compensating dashpot mechanism may be increased automatically when manual control of the load is effected, while at other times its normal rate of operation will prevail.

With hydraulic turbine governors it is essential to provide restoring and compensating mechanisms to prevent "racing" or "hunting" of the governor when controlling speed. The pilot valve on the governor is actuated by the speed responsive element, such as the centrifugal flyball head, in response to fluctuations in turbine speed thereby causing the gates to move to return the speed to normal. However upon movement of the gates the component actions of restoring and compensating mechanism are as follows. Movement of the gates is transmitted to the pilot valve to restore the same to neutral, thereby checking movement of the gates and preventing unnecessary overtravel thereof. This restoring action is transmitted through linkages connecting the gates with the governor and in which is also interposed a compensating mechanism in the form of a dashpot. The effective transmission of the gate motion to the pilot valve for restoring purposes is therefore dependent upon the tightness of the dashpot and its ability to act as a solid link to check the pilot valve movement. However, after this movement of the restoring mechanism the dashpot effects a compensating action by returning to neutral position whereby the pilot valve moves away from its neutral position to permit further gate movement. In actual operation the restoring and compensating actions operate simultaneously so as to give a resultant action equal in effect to the component actions just described. The return of the dashpot mechanism to its neutral position, as determined by inherent speed drop mechanism sometimes referred to as no-load full-load compensating mechanism, must be at a slow rate so that overtravel in the opposite direction is not introduced. Such an arrangement is ideally suited to speed control in the case of isolated units but with interconnected generating systems the requirements for speed regulation by the governor are not so severe as to require such ideal speed control because when a unit is once in parallel with other generating units the output of the unit is more frequently adjusted manually by the operator or automatically through special control devices without any speed change being effected. Hence the speed control element is relatively stationary whereas the adjustment of load through the adjustment of the linkage above the dashpot is most frequently employed. In the case of manual adjustment it will be understood that a synchronizing motor, sometimes called a load adjusting motor, is adapted through suitable gearing to vary the position of the floating lever of the governor relative to the dashpot mechanism and thereby adjust the pilot valve and accordingly effect gate movement and load adjustment irrespective of the turbine speed.

The desirable functions of the compensating dashpot and restoring mechanism when controlling speed tend to introduce difficulties when manual or motor operated load adjustment of the unit is effected in that the very slow rate of return of the dashpot to its normal or neutral position causes the gates to continue to move for some time after initial adjustment of the restoring mechanism linkage. This of course is undesirable as the dashpot may require several seconds or minutes to come to its neutral position if properly adjusted for speed control and if this adjustment is made more rapid as by having a larger opening of the usual by-pass then the speed controlling functions of the governor are seriously impaired. Continual changing of this adjustment as should be done whenever transferring from load adjustment operation to speed control, such as when starting a unit and synchronizing it with the generating system, would impose an unnecessary burden on the operating staff in an attempt to secure the most satisfactory conditions at all times.

My invention as described herein permits the dashpot and restoring mechanism to be set for speed control purposes and at the same time provides for an automatic opening of a dashpot by-pass whenever load adjustments are required on the unit through the action of the load adjusting motor operated from some remote point. In one specific aspect of the invention there is provided an auxiliary by-pass controlled by a movable needle valve which is operated by a solenoid connected in the common feed line to the load adjusting motor in such a manner that the solenoid will be energized for any movement of the load adjusting motor from the remote point. This action of the solenoid actuates the needle valve to permit dashpot oil to by-pass from one side of the dashpot to the other, thus allowing the dashpot to take up its new position promptly without the necessity of the long delay which is introduced otherwise and also without impairment of the normal speed regulating functions of the governor as this by-pass is not effective unless some adjustment in the load is made.

One object of my invention is to provide improved means whereby the load on the unit may be quickly adjusted while a more specific object in this respect is to provide improved means for variably controlling the rate of operation of the compensating mechanism, this variable control being in addition to the normal controlling action of other elements such as the inherent speed drop device and its associated centralizing element. Still another object is to provide an improved by-pass and actuating means therefor whereby this by-pass will merely supplement the usual by-passing action in the dashpot and will do so only when the load adjusting or synchronizing mechanism is actuated while at all other times the supplemental by-pass remains closed, thereby permitting the compensating action to operate in its normal manner.

Other objects and advantages will be more apparent to those skilled in the art from the following description of the accompanying drawings in which:

Fig. 1 is a fragmentary vertical section of a speed governor to which my invention is applied, parts of the governor being shown in elevation for simplicity;

Fig. 2 is an enlarged vertical section of the dashpot on line 2—2 of Fig. 1, showing my improved control associated therewith; and Fig. 3 is a fragmentary portion of the dashpot with a modified form of my invention applied thereto.

Fig. 4 is an enlarged view of the dashpot shown in Fig. 1.

Fig. 5 is an enlarged sectional view to show the operative relation between the control valve mechanism of a hydraulic prime mover and the restoring mechanism of the governor;

Fig. 6 is an enlarged sectional view of the distributing valve and its relation to the opposite ends of the gate operating servo-motor;

Fig. 7 is an enlarged fragmentary sectional view of the pilot valve for controlling the distributing valve.

In the drawings there is shown, merely for the purpose of illustrating two specific embodiments which the invention may take, a governor of the type disclosed in my Patent No. 1,901,831, issued March 14, 1933. My improved control is shown herein as applied to such a type of governor, although it will of course be understood that any suitable or usual type of governor may be employed. The governor comprises a base 1 having a main valve generally indicated at 2 for distributing fluid pressure from an intake 3 to one or the other of supply passages 4 and 5 leading to a suitable gate operating servo-motor S, Figs. 5 and 6, usually in the form of a piston and cylinder. This servo-motor is for the purpose of moving the operating gates of the prime mover which in the case of a hydraulic turbine T may be well-known wicket gates G', Fig. 5, or any other usual type of flow control mechanism. The governor distributing valve also controls the exhaust of fluid from one end of the servo-motor cylinder as through an exhaust passage 6. The distributing valve 2 is controlled by a pilot valve mechanism generally indicated at 8 and hereinafter described in detail.

To actuate the pilot valve in accordance with speed variations of the prime mover, there is provided in the form of governor herein shown a motor 9 connected to the line or generator so as to drive a centrifugal fly-ball head 10 in accordance with the speed of the prime mover. The driving connection for the fly-ball head may of course be of the usual direct connected mechanical type but in either case variations in speed of the prime mover will actuate a floating collar 11 which carries a floating lever 12 pivoted thereto as at 13. The right end of this floating lever is connected to the pilot valve stem through a suitable double acting spring arrangement contained in a housing 14. The other end of floating lever 12 is pivotally connected to a collar 16 which is adjustably threadedly secured to a rotatable sleeve 17. This threaded sleeve may be actuated through suitable gearing by a synchronizing or load adjusting motor 18'.

Assuming that the speed varies from a predetermined or normal value the fly-ball head 10 will raise or lower the lever 12 and pilot valve mechanism 8 in accordance with whether the variation is above or below normal, the lever initially swinging about the collar 16 as a fixed point. The distributing valve 2 is thereupon actuated to cause movement of the servo-motor, this movement then being transmitted through restoring mechanism including usual linkages 18a connecting the servo-motors with a vertically movable rod 18 suitably guided in a bracket 19 mounted on the base 1. The upper end of restoring rod 18 is pivotally connected to a connection 20 which in turn carries a vertically movable dashpot cylinder 21. To transmit this restoring movement through the cylinder 21, there is provided a dashpot piston 22 whose upper end (see transverse sections of Figs. 2 and 4) is connected through a cylindrical projection 23 to a spindle 24 upon which the sleeve 17 is journalled. A coil spring 27 is interposed between a shoulder 28 on the upper end of piston 22 and a washer 29 which rests at its outside on a flange 30 carried by piston 22 and at its inside it rests on a flange 31' formed on an inner sleeve 31. This inner sleeve is connected through suitable cross arms 31a which extend laterally through openings 31h formed in the walls of extension 23. The outer ends of these arms are secured to a vertically movable sleeve 31c by being held in a suitable recess in sleeve 31c by a cap 31d having legs 31e engaging the top of said arms. Sleeve 31c in turn is connected by a link 31f to an inherent speed drop device generally indicated at 31g which is well-known and hence need not be described in detail but which is incorporated within the connection 20, Fig. 1. (For inherent speed drop or change, see Kerr Patent No. 1,901,831 at page 5, line 95 and page 6, line 98). A centralizing mechanism includes a rod 32 projecting downwardly from the upper end of sleeve 31 and extending through a suitable opening 33 for controlling flow of liquid between cylinder 21 and the interior of dashpot piston 22, automatically in accordance with operation of the restoring and compensating actions.

From the foregoing it is seen that movements of the servo-motor will be transmitted through rod 18, dashpot cylinder 21, and piston 22 to the sleeve 17 and the left end of floating lever 12 thereby to raise or lower the same and restore the pilot valve to neutral thus checking movement of the gates. Assuming upward movement of rod 18 and a corresponding upward movement of cylinder 21, fluid is compressed beneath dashpot piston 22 and thereby raises the same. Collar 30 on piston 22 will move upwardly therewith to compress spring 27, the upper end of this spring being held against movement due to being engaged by arms 31a. It will be noted from Fig. 4 that the upper end of piston 22 has slots 31h formed in its side for a substantial axial length thereof to permit considerable movement of dashpot piston 22 without interfering with arms 31a. When adjustment of the turbine or other prime mover ceases, movement of rod 18 will likewise stop. Hence spring 27 will gradually move piston 22 downwardly at a rate determined by the flow of fluid through opening 33. If piston 22 should move downwardly upon downward movement of rod 18 then washer 29 would remain on flange 31' while shoulder 28 moved downwardly with piston 22 to compress spring 27 whereupon when adjustment of the turbine or prime mover stops, spring 27 would urge piston 22 upwardly. It is thus seen that initial restoring movement of dashpot cylinder 21 will cause return of the pilot valve stem to its neutral position whereupon subsequent compensating action of spring 27 and the dashpot will cause the pilot valve mechanism to move away from its neutral position and thereby allow further movement of the servo-motor, all as is well known in the art. The restoring and compensating actions just described operate simultaneously to give a resultant action equivalent to the component actions just described.

To adjust the output of the unit irrespective of its speed the synchronizing motor 18' is operated usually from a remote point such as a control room. The motor rotates sleeve 17 through its gear 23a which is adapted to slide axially of the elongated actuating pinion 23b thereby causing the left end of floating lever 12 to move up or down with respect to the dashpot and pivot about the floating collar 11. The right end of floating lever 12 and the pilot valve secured thereto are accordingly adjusted to vary the output of the unit even though the speed has not changed. However upon adjustment of the gates the restoring and compensating mechanisms function in the same manner as just described when a speed change takes place. With the dashpot by-pass adjusted for speed control it is seen that its adjustment may not be sufficiently fast for manual control. To effect a relatively rapid power adjustment during manual control I have provided a by-pass 35 controlled by a needle valve 36 which extends upwardly through the cylindrical projection 23 and is guided thereby as by a suitable removable bushing 37 threadedly secured in the member 23. A head 38 formed in the upper end of needle valve 36 has an annular groove in which projects the reduced end of a lever 39. A suitable lateral opening is provided in the wall of member 23 to admit lever 39, and this opening is so dimensioned as to permit sufficient up and down movement of lever 39 in said opening and thus permit the needle valve and dashpot mechanisms to move together, either when the by-pass 35 is closed at any time or when it is opened at any portion of the stroke of the dashpot.

To effect actuation of lever 39 automatically when manual control is initiated there is provided a solenoid 40 connected in series with the synchronizing motor 18 so that upon energization thereof the solenoid will be simultaneously actuated to open the by-pass 35 irrespective of the direction in which the synchronizing motor is rotated, it being understood that the same is of the reversible type. The core of the solenoid carries a cross member 41 from which rods 42 project upwardly through lateral ears 43 formed on a suitable bracket 44 which is secured to the bottom of the solenoid and extends upwardly on each side thereof. Springs 45 are interposed between the ears 43 and cross member 41 so as to normally urge the solenoid core to its down position. Carried by the cross member 41 and projecting downwardly through an enlarged opening in lever 39 is a threaded rod 46 having lost motion connection with lever 39 as by nuts 47 and 48 provided with suitable washers. To provide additional downward spring pressure on lever 39 a spring 50 is interposed between suitable collars on a stud 51 which is rigidly carried by the bracket 52 mounted on the governor base 1. Stud 51 also carries an adjustable nut 53 which limits upward movement of lever 39, it being understood that stud 51 projects through a suitable enlarged opening in lever 39.

In the normal operation of the governor if the speed increases from normal, the fly-ball head 10 will cause floating collar 11 and pivot 13 to raise the right end of floating lever 12, thereby causing the pilot valve mechanism 8 and distributing valve 2 to supply and discharge fluid to the gate operating motor so as to move the same in a direction to close the turbine gates, the servo-motor movement in turn being transmitted in an upward direction to the restoring rod 18 and dashpot cylinder 21, which in turn causes the dashpot piston 22 to move also upwardly and accordingly raise the left end of floating lever 12 as through the threaded sleeve 17 and upward projection 23. This action tends to restore the pilot valve mechanism 8 and distributing valve 2 to their neutral position, thereby closing off the distributing ports. However, the compensating action of the dashpot mechanism tends to maintain the pilot valve displaced from its neutral position, so that the servo-motor can complete its movement. This compensating operation is effected due to the fact that upon upward movement of cylinder 21 oil is trapped beneath piston 22, thereby raising the latter to cause ring 29 to be lifted by flange 30 against the compression of spring 27 and upwardly away from the flange 31' on the inner member 31. Spring 27 thereafter exerts a downward force on piston 22 through the flange 30, thereby causing the piston to move downwardly at a rate controlled by the by-pass of fluid through the centralizing mechanism including the passage 33. When piston 22 has moved down to a point where ring 29 again rests on the flange 31', the compensating action is fully accomplished, it being noted that during downward movement of piston 22 the axial projection 23 and threaded sleeve 17 are also moved downwardly. This compensating action may take an appreciable length of time such as a matter of several seconds or minutes which is desirable in normal speed control of the unit. However, when it is desired to adjust the output of the load irrespective of speed, one instance of which may be when the load is being proportioned between parallel connected units wherein the speed would remain constant, it may be preferable to do so as quickly as possible without the normal time lag of the compensating mechanism. To initiate this type of operation the operator closes the switch for rotating the load adjusting or synchronizing motor 18' in one or the other direction, depending upon whether an increase or decrease in load is desired. If the load is to be decreased the motor is operated to lower the left end of floating lever 12 and accordingly raise the right end thereof, thereby causing the servo-motor to move the gates of the prime mover and also transmit movement in an upward direction to rod 18 which tends to raise the left end of the floating lever 12 and restore the right end thereof and pilot valve to neutral. Upon upward movement of the restoring rod 18, dashpot 21 is likewise raised but in either case it returns to neutral to compensate for the restoring action and permit completion of gate movement. To decrease the time necessary for the dashpot to return to neutral the supplemental by-pass 35 is opened only when the load adjusing motor 18 is operated. To accomplish this, solenoid 40 is energized during operation of the motor 18 as by being in series therewith, thereby raising lever 39 and needle valve 36 which are connected thereto. It is thus seen that the supplemental by-pass 35 will allow piston 22 to be moved by spring 27 more rapidly than if the by-passing was effected only by the centralizing by-pass 33. It is also seen that at all other times when the load adjusting motor is not in operation, needle valve 36 will keep the by-pass 35 closed. The supplemental by-pass remains closed during normal up and down movement of the dashpot mechanism due to lever 39 freely moving with the dashpot, although the needle valve is maintained closed by the compression springs 42 and 50 against which the solenoid pulls when energized.

In the modification of Fig. 3 the solenoid is carried by a bracket 52' secured to projection 23 so as to move with the dashpot piston, thereby eliminating some of the necessary lost motion between nuts 47 and 48 as required in the Fig. 2 form.

It is thus seen that I have provided a relatively simple and positive arrangement for permitting normal speed control of a unit by the governor and yet when it is desired to adjust the load promptly and irrespective of speed the governor is temporarily readjusted automatically only during the load adjusting operation.

The main distributing valve 2, Figs. 2 and 6, operates inside of a liner 2a which is provided with ports to be described corresponding to those of the valve. The movement of the distributing valve is controlled by the pilot valve mechanism generally indicated at 8, the pilot valve as is usual being operated, Fig. 1, by the centrifugal head 10 through a floating lever 12 and any suitable connection diagrammatically indicated at 14 between the floating lever and pilot valve 8. When the pilot valve 8 as shown in Figs. 6 and 7 moves upwardly from its neutral position, fluid pressure is admitted from passage 3 through a series of radial ports, 8a, Fig. 7, to an annular groove 8b. This groove communicates with a longitudinal groove 8c and another annular groove 8d, from which fluid passes through radial ports 8e and thence downwardly past the valve spool 8f (which is now assumed to be in raised position), to a longitudinal passage 8g to thus allow fluid pressure to be admitted at the lower end 31a, Fig. 6, of the main distributing valve. At the same time fluid pressure is discharged from the upper end 31b, Fig. 7, of the main distributing valve, as through passage 8h, port 8i and passage 8j. This causes the main valve to move upwardly and permit flow of actuating fluid from the supply passage 3 into closing chamber 4 by ports 28a, while at the same time, allowing exhaust of fluid from an opening chamber 5 into a chamber 30a through ports 31b. Opening and closing chambers 5 and 4 communicate respectively with the opposite ends of the servo-motor cylinder S by passages 32a and 33a. When the pilot valve 8, Figs. 6 and 7, moves downwardly from its neutral position, the opening and closing chambers are connected respectively with the supply passage 3 and chamber 30a by ports corresponding to ports 28a and 31a but in the opposite end of the main valve.

It will be of course be understood that various changes may be made in the construction and arrangement of parts of the invention as specifically illustrated herein without departing from the spirit of the invention as set forth in the appended claims.

I claim:

1. Control apparatus for a prime mover comprising, in combination, a speed responsive governor, manually controlled means for effecting a load adjustment setting of the control apparatus, restoring and compensating mechanisms therefor normally operative during variations in the prime mover speed from a given value, and means for adjusting said compensating mechanism so as to vary its normal rate of operation automatically when said manual operation is effected.

2. Control apparatus for a prime mover unit comprising, in combination, a speed responsive governor adapted to effect control of the output of the prime mover automatically in accordance with variations in speed from a predetermined value, means for adjusting said control apparatus thereby to effect adjustment of the output of the unit during relatively constant speed thereof, compensating mechanism rendered operative whenever said adjustment is effected, and means whereby the operation of said compensating mechanism is varied automatically when the load setting is adjusted during constant speed of the prime mover.

3. Control apparatus for a prime mover unit comprising, in combination, a speed responsive governor adapted to effect adjustment of the output of the unit automatically upon variations in speed thereof from a predetermined value, synchronizing mechanism associated with said governor for additionally effecting adjustment of the output of the unit during relatively constant speed thereof, compensating mechanism associated with said governor and operative whenever the setting of the governor is adjusted to effect adjustment of the unit output, and means for adjusting said compensating mechanism automatically during operation of said synchronizing mechanism.

4. Control apparatus for a prime mover unit comprising, in combination, a speed responsive governor adapted to have its setting adjusted thereby to effect adjustment of the unit output upon variations in speed thereof from a predetermined value, synchronizing mechanism associated with said governor for additionally adjusting the setting thereof thereby to further adjust the unit output, a compensating dashpot mechanism associated with said governor and adapted to have one rate of operation during adjustment of the unit output upon speed variations and a different rate of operation during adjustment of the output by the synchronizing mechanism, and means for variably controlling dashpot fluid to effect said different rate of operation automatically when said synchronizing mechanism is operated.

5. Control apparatus for a prime mover unit comprising, in combination, a speed responsive governor adapted to effect adjustment of the unit output upon variations in speed thereof from a predetermined value, synchronizing mechanism associated with said governor for additionally adjusting the setting of the governor thereby to effect adjustment of the unit output, a compensating dashpot mechanism associated with said governor and adapted to have one rate of operation during adjustment of the unit output upon speed variations and a different rate of operation during adjustment of the output by the synchronizing mechanism, and means for variably controlling dashpot fluid to effect said different rate of operation automatically when said synchronizing mechanism is operated, and upon termination of the operation by the synchronizing mechanism the first rate of operation of the dashpot mechanism is reestablished.

6. Control apparatus for a prime mover unit comprising, in combination, a speed responsive governor adapted to effect adjustment of the unit output upon variations in the speed thereof from a predetermined value, synchronizing mechanism adapted to additionally adjust the setting of the governor thereby to further adjust the unit output, compensating mechanism associated with said governor and operative at one rate when the unit output is adjusted in accordance with speed variations and operative at a different rate during adjustment of the unit output by the synchronizing mechanism, and means for effecting said different rate automatically when said synchronizing mechanism is actuated.

7. Control apparatus for a prime mover unit comprising, in combination, a speed responsive governor adapted to effect adjustment of the unit output in accordance with variations in speed from a predetermined value, synchronizing mechanism for additionally adjusting the setting of the governor thereby to effect further adjustment of the unit output, compensating mechanism associated with said governor and adapted to have one rate of operation when the unit output is adjusted in accordance with speed variations and to have a different rate of operation when the unit output is adjusted by the synchronizing mechanism, and means for effecting said different rates of operation automatically in accordance with the selected mode of adjustment for the unit output.

8. Control apparatus for a hydraulic turbine unit comprising, in combination, a speed responsive governor having a pilot valve adapted to be actuated in accordance with variations in speed of the prime mover from a predetermined value, an electric motor operated synchronizing mechanism adapted to also actuate said pilot valve, a compensating dashpot mechanism adapted to control said pilot valve upon adjustment of the unit output, means whereby said dashpot has a normal rate of operation during adjustment in accordance with speed variations, and electrically operated means for changing the rate of operation of said dashpot automatically upon operation of the synchronizing electric motor.

9. Control apparatus for a hydraulic turbine unit comprising, in combination, a speed responsive governor adapted to effect adjustment of the unit output automatically in accordance with variations in speed of the turbine from a predetermined value, an electric motor operated synchronizing mechanism for additionally adjusting the setting of the governor thereby to effect further adjustment of the turbine output, a compensating dashpot mechanism having provision for variably by-passing the dashpot fluid including a valve, and a solenoid for actuating said valve and adapted to be energized automatically upon operation of said electric motor.

10. Control apparatus for a hydraulic turbine unit comprising, in combination, a speed responsive governor adapted to effect adjustment of the unit output automatically in accordance with variations in speed of the turbine from a predetermined value, an electric motor operated synchronizing mechanism for additionally adjusting the setting of the governor thereby to further adjust the turbine output, a compensating dashpot mechanism having provision for variably by-passing the dashpot fluid including a valve, a solenoid for actuating said valve, and a series circuit for supplying said motor and solenoid whereby said solenoid is energized automatically upon operation of said electric motor to thereby change the rate of by-passing the dashpot fluid.

11. Control apparatus for a hydraulic turbine unit comprising, in combination, a speed responsive governor adapted to effect adjustment of the unit output automatically in accordance with variations in speed of the turbine from a predetermined value, an electric motor operated synchronizing mechanism for additionally adjusting the setting of the governor thereby to effect further adjustment of the turbine output, a compensating dashpot mechanism having provision for variably by-passing the dashpot fluid including a valve, and a solenoid for actuating said valve and adapted to be energized automatically upon operation of said electric motor, said valve being associated with a movable part of said dashpot and said solenoid being operatively connected with the valve so that the valve may have a fixed position throughout the movement of the dashpot and upon actuation of the solenoid at any part of the dashpot stroke the valve will be moved from its fixed position.

12. Control apparatus for a hydraulic turbine unit comprising, in combination, a speed responsive governor adapted to effect adjustment of the unit output automatically in accordance with variations in speed of the turbine from a predetermined value, an electric motor operated synchronizing mechanism for additionally adjusting the setting of the governor thereby to effect further adjustment of the turbine output, a compensating dashpot mechanism having provision for variably by-passing the dashpot fluid including a valve, and a solenoid for actuating said valve and adapted to be energized automatically upon operation of said electric motor, said solenoid being carried by a movable part of said dashpot whereby the valve may have a fixed position throughout the dashpot stroke.

SAMUEL LOGAN KERR.